April 20, 1965     A. F. CECH     3,178,790
LOAD FASTENER
Filed Sept. 3, 1963
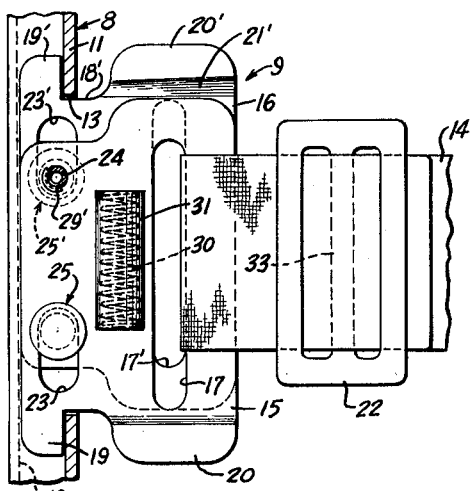
Fig. 2.
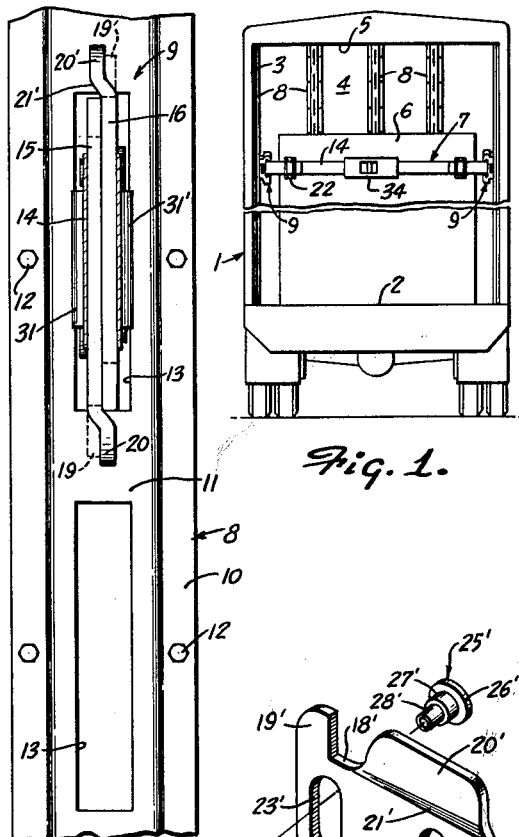
Fig. 3.
Fig. 1.
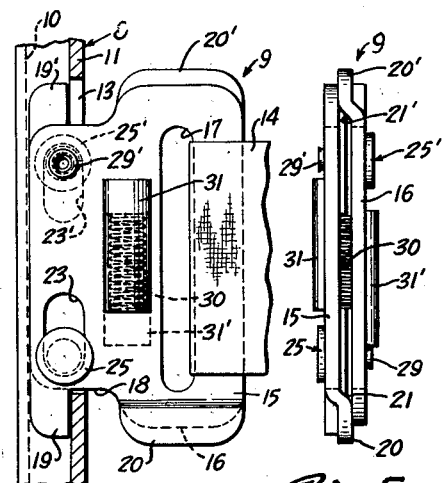
Fig. 4.
Fig. 5.
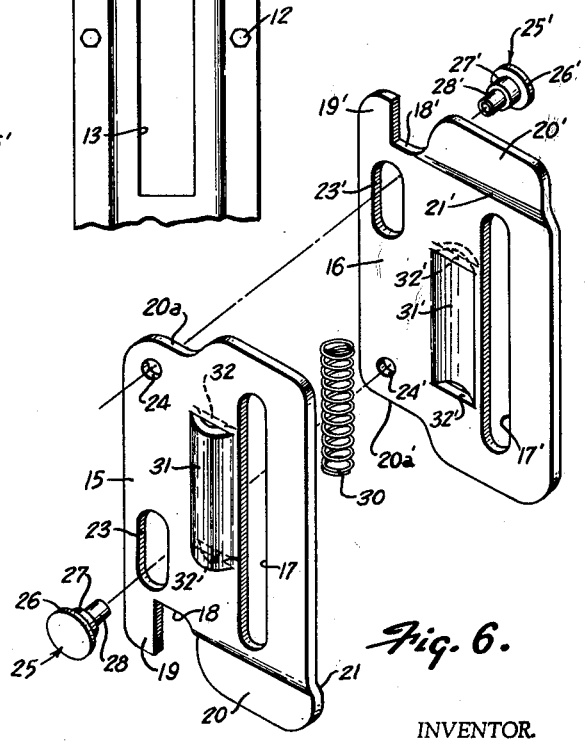
Fig. 6.
INVENTOR.
ANTHONY F. CECH
BY
Andrus & Starke
ATTORNEYS

United States Patent Office 3,178,790
Patented Apr. 20, 1965

3,178,790
LOAD FASTENER
Anthony F. Cech, Whitefish Bay, Wis., assignor to Lakeview Manufacturing Corporation, Milwaukee, Wis., a corporation of Wisconsin
Filed Sept. 3, 1963, Ser. No. 306,090
8 Claims. (Cl. 24—265)

This invention relates to a releasable load fastener for a strap or the like and particularly to a fastener for releasably securing a load supporting strap to the wall of a conveying means such as a truck trailer, freight car or other movable carrier.

In the transporting of goods by truck, railway freight cars, or in storing of material in large box-like structures, the goods or cargo is preferably locked in position through the use of suitable tie-down straps, braces or bars interconnected between the walls of the storage structure. Generally, the cargo will vary in dimension and size from load to load and the tie-down system must be such as to accommodate the many different loads. One system employs straps which are secured to slotted channel members distributed about the walls of the carrier by coupling members releasably disposed within channel openings or slots by a hook and slot type connection in accordance with the location of the cargo within the cargo space.

The present invention is particularly directed to providing a strong and reliable interconnecting novel hook fastener for releasable connection of a strap to supporting anchor channels and the like. The fastener of the present invention includes a resilient interconnection of hook members which permits ready hand operation for simple insertion and removal of the fastener while maintaining a reliable and firm interconnection of the strap in a loaded position.

Generally in accordance with the present invention, the fastener includes a pair of hook members which are resiliently urged in an expanded or opposite position with the hooks then disposed to engage the back side of a slotted channel or the like in holding engagement. The hook members may be readily collapsed against the resilient force to a position for removal from the hook opening on the anchor channel but are held fast by strap tension to prevent collapse in a loaded position. The fastener in accordance with one aspect of this invention includes a pair of substantially identical plate-like elements mounted in sliding engagement having aligned slots for receiving the web or the strap member. Each of the plate-like elements has a straight edge on one side and an edge notch defining a hook for engaging the anchor channel and an offset locating lip on the opposite side. The plates are mounted with the faces in immediate side by side relationship with the hooks extending in aligned and opposite directions and with the offset lips of each aligned with and overlapping the straight edge of the opposite plate.

The plates are secured together through a pin and slot arrangement provided in alignment with the hook portions to allow limited movement of the plates in the principal planes thereof. Similar outward depressions or offset portions centrally of each plate cooperatively define a spring receiving chamber within which a coil spring is disposed. The coil spring is compressed and thus resiliently urges the plates outwardly to dispose the hook portions in holding position. The fastener plates may be collapsed against the force of the spring to a position allowing insertion and removal of the hooks through the slot in the channel when the strap is unloaded. With the strap passed through the slots and extending immediately adjacent the fastener plates, lateral and opposed forces are applied to opposite sides thereof and the straight edge of each is held in alignment with the shoulder defined by the offset lip of the opposite plate. As a result, in the loaded position, the plates are prevented from moving in the general plane of the plates and thereby prevent collapsing of the hook members. However, with the strap tension released, the plates separate slightly and allow the straight edges to move over the offset portion of the opposite plate and may then move relative each other to reduce the hook span and permit removal through the opening in the anchor member.

The present invention thus provides a reliable and readily attached and detached fastener for a strap or other similar member which may be constructed of a minimum number of parts thereby reducing manufacturing costs.

The drawing furnished herewith illustrates the best mode presently contemplated for carrying out the invention and clearly disclosing the advantages of the present invention as heretofore discussed as well as additional advantages which will be obvious from this description.

In the drawing:

FIG. 1 is an end elevational view of a truck showing the application of the invention to a cargo carrier;

FIG. 2 is an enlarged side elevational view showing the strap fastener shown in FIG. 1;

FIG. 3 is generally an end view of the fastener shown in FIG. 2;

FIG. 4 is a view similar to FIG. 2 showing the fastener collapsed for removal from the channel support of the carrier;

FIG. 5 is an end view of FIG. 4 similar to FIG. 3; and

FIG. 6 is a perspective exploded view of the fastener shown in FIGS. 1–5.

Referring to the drawing and particularly to FIG. 1, a box-like cargo carrier such as a truck trailer body 1 or the like is shown including a floor 2, vertical side walls 3 and end or back wall 4 and a top wall or roof 5. In the illustrated embodiment of the invention, a single load 6 is shown located in the front or forward portion of the body 1 and extending substantially between the side walls 3. To prevent movement of the load 6 within the trailer body 1, a tie-down or load strap assembly or unit 7 spans the body 1 between the side walls 3 and is secured at its opposite end to side wall anchor channels 8 by load strap fasteners 9, which constitute the principal subject of the present invention. Generally, anchor channels 8 will be spaced throughout the truck body, as shown, to allow various positioning of the strap unit 7 in accordance with the location of the load 6, including the back wall 4 and if desired the top wall or roof 5 for locating or tying the strap in various desired positions in accordance with the shape and character of the load 6. The illustration of FIG. 1 is given for purposes of clearly illustrating one application of the present invention.

Referring particularly to FIGS. 2–6, the illustrated fastener 9 and the shape of channels 8 is more clearly illustrated.

Generally, the anchor channels 8, as more clearly shown in FIGS. 2 and 3, include edge flanges 10 integrally secured to the edges of a U-shaped attachment portion 11. The flanges 10 are disposed in immediate engagement with the wall of the body 1 and are secured thereto by attachment bolts 12 or the like with the U-shaped portion 11 protruding slightly from the wall of the body 1. If desired, suitable filler sheets or the like, not shown, can be mounted between the channels to provide a continuous smooth wall surface. In either event, channel 8 is provided with a plurality of longitudinally spaced rectangular slots 13 having the principal axis of the slots parallel to the principal axis of the channels 8. The fasteners 9 are releasably hooked within a slot 13 of channel 8 adjacent the front vertical edge of load 6, as hereinafter particularly described, for securing the adjacent end of a strap 14 of the strap assembly or unit 7 to the adjacent wall.

Generally, the fastener 9 which constitutes the subject matter of this invention includes a pair of plate-like members 15 and 16 of generally rectangular configuration or shape mounted with the faces or principal surfaces adjacent one another. Plates 15 and 16 define a generally plate-like fastener 9 having a hooked connection to channel 8 along a major edge and extending outwardly therefrom. Each of the plates 15 and 16, as most clearly shown in FIG. 6, is of an identical construction and consequently the plate 15 will be described hereinatfer with the corresponding portions of plate 16 correspondingly numbered with a super prime added for distinguishing the corresponding portions thereof.

The plate 15 includes a strap slot 17 extending parallel to the principal axis of plate 15 and along the outer edge thereof. The slot 17 is of a slightly greater length than the width of the strap 14.

The one minor edge of plate 15, shown as the lower edge, includes a notch or recess 18 defining a hook 19 extending longitudinally of a major edge and in offset locating edge or lip 20 to the opposite side of the notch. The opposite minor edge includes a notch 20a aligned with the hook 19 and forming the major edge including the hook of a length substantially the same as the major length of the slot 13 in channel 8. In the assembled relation, the hook 19 of the plate 15 engages the back side of the channel 8 immediately adjacent the one end of slot 13, as shown in FIG. 2, with the recess accommodating the adjacent body portion of the channel. The plate 16 is similarly formed with a notch 18' but is oppositely disposed in the fastener 9 to locate the hook 19' at the opposite end of the fastener 9 and engaging the opposite end of slot 13.

The offset edge or lip 20 of plate 15 is extended or struck outwardly as an integral portion of the plate to generally position the lip in the plane of the adjacent plate 16 and defining a lateral shoulder 21 immediately in alignment with and adjacent the straight edge of the plate 16. The strap 14 is passed through the aligned slots 17 and 17' of the plates 15 and 16 and secured together by a two-slot friction end fastener 22. When a load is applied to strap 14, the strap on the opposite sides of the fastener 9 positively exerts a laterally inwardly directed force on the plates 15 and 16 and holds the plates 15 and 16 in engagement. As a result, each of the shoulders 21 and 21' present a stop surface to the adjacent straight end of the opposite plate and positively prevents relative collapsing or retracting movement of the plates 15 and 16 and disengagement of the corresponding hooks 19 and 19' from the slot 13. If desired, the shoulder 21 may include a sharp inner corner engaged by the edge of the plate to more positively lock the plates together in the loaded position.

When the tension on strap 14 is relieved, the lateral holding force exerted by the strap portions adjacent the opposite faces of plates 15 and 16 is removed As a result, the plates 15 and 16 are free to separate or move laterally to overlap at the offset lips 20 and 20' and may be moved relative one another along the principal axis of the plates; i.e., in a vertical plane when viewed in the drawing.

The plates 15 and 16 are interconnected for sliding movement as follows.

The plate 15 includes a retaining slot 23 adjacent the hook 19 and extending parallel to the strap slot 17. A small rivet opening 24 is provided in spaced aligned relation with the retaining slot 23 generally in lateral alignment with the opposite end of the strap slot 17. The plate 16 includes a similar construction.

With the plates disposed in the opposite end to end relationship, the retaining slot 23 is aligned with the small rivet opening 24' of plate 16 and the small rivet opening 24 of plate 15 is aligned with the retaining slot 23' of the adjacent plate 16.

A rivet 25 extends through the slot 23 and the aligned rivet opening 24' and a rivet 25' extends through slot 23' and opening 24 for interconnecting of the two plates in sliding engagement. The rivet 25 includes a head 26 of a greater diameter or size than the retaining slot 23. The head 26 is secured to a stepped shank having a main or first shank portion 27 attached directly to the head and generally of a diameter corresponding to that of the retaining slot 23 and an outer reduced shank portion 28 of a diameter substantially corresponding to that of the rivet openings 24. The rivet 25 in the assembled relation has the head bearing against the plate 15 with the shank portion 27 slidably journalled in the slot 23 and with the reduced shank portion 28 projected through the rivet opening 24. Shank portion 27 is slightly greater in length than the thickness of plate 15 to allow limit lateral movement. This permits the lateral movement of the strap slotted portion of the plates 15 and 16 during collapsing thereof. The outermost ends of the rivets 25 and 25' are spread or rolled, as at 29 in FIGS. 2 and 4 to positively interconnect the rivets to the corresponding plates 16. The opposite ends of the plates are interconnected by the rivet 25' which projects through the retaining slot 23' and is secured to the plate 15 by rolling over adjacent the small rivet opening 24. This construction allows relative movement in the direction of the retaining slot 23.

Plates 15 and 16 may be expanded into the hook securing position shown in FIG. 2. In this position, the strap openings or slots 17 and 17' are longitudinally offset with strap 14 passing through the centrally aligned portions. The plates 15 and 16 may also be collapsed or retracted with the plates and with the slots 17 and 17' thereof superimposed over one another as shown in FIGS. 4 and 5 for insertion and removal with respect to the slot 13 of the anchor channel 8. In FIG. 4, the collapsed position of the plates 15 and 16 disposes one hook, shown as hook 19' in alignment with the corresponding edge of the channel slot 13. If desired, the collapse position may be increased slightly such that the fastener must also be tilted or twisted sideways within the slot 13 in alignment with opposite corners thereof for removal.

The plates 15 and 16 are urged to the expanded hook position of FIGS. 2 and 3 by a coil spring 30 which is disposed within a coil chamber generally centrally located of the plates 15 and 16. The coil chamber is defined by a struck out groove or depression 31 centrally formed in the plate 15 with a similar groove or depression 31' formed in the plate 16. For optimum springholding, the plate 15 is severed at the ends of the groove 31 such that the end edges of the grooves are flat surfaces as at 32 providing positive seating for the opposite ends of the coil spring.

When the plates 15 and 16 are moved into superimposed relationship the coil spring 30 is compressed such that when the plates 15 and 16 are released, they are positively urged outwardly into the hooking or engagement position of FIG. 2. The rivet shanks 28 and 28' limit the respective movement of plates 15 and 16 by engaging the inner edges of slots 23 and 23' in the expanded position of FIG. 2 and the outer edges thereof in collapsed position of FIG. 4.

As previously noted, the strap 14 is extended through the slots 17 and 17' and secured back on itself in any suitable manner, to prevent collapsing of the plates 15 and 16 during the load supporting. In the illustrated embodiment of the invention, the fastener 22 is shown as a two-slot threading plate having a central tongue 33. The strap 14 is threaded through the slots and about the tongue 33, through the aligned strap slots 17 and 17' of plates 15 and 16 and then back through the threading plate in the opposite direction, as shown most clearly in FIG. 2. Pulling on the load end of strap 14 results in a frictional loading within the fastener 22 which prevents unthreading of the opposite or free end.

Further, the illustrated strap assembly 7 has strap 14 shown as a pair of individual separate strap lengths interconnected at the center by a suitable buckle 34 of any suitable construction. For example, the buckle shown in the U.S. Patent 2,825,109 which issued to A. G. Nelson on March 4, 1958 may be employed. If desired, a single length of strap might be employed with a suitable tightening means, or, short strap lengths may be secured to fasteners 9 and have closed loops to receive securing ropes or the like. In summary, fastener 9 of this invention may be employed with any suitable flexible securing means having a generally strap-like portion at the end or ends.

The present invention provides a hook attaching member which may be readily and manually attached and detached. In the loaded position, it provides a very positive reliable support for the load.

I claim:

1. A fastener for releasably securing a strap to a support having a securement opening, comprising
   (a) a hook unit having a pair of opposed spaced and oppositely extending hook members for engaging opposite edges of said opening and having means releasably securable to the strap,
   (b) connection means interconnecting said hook members for limited relative movement between an extended position engaging the support and a retracted position disposing the hooks in position to pass through the opening,
   (c) cooperative holding means on said hook members for engagement by said strap to prevent retraction of said hook members under the forces of said strap, and
   (d) resilient means urging said hook members to said extended position and being hand collapsible in absence of loading on said holding means to allow manual removal of the fastener from the support.

2. An attachment assembly for securing one end of a flexible member to a support having a slot and a fastener releasably hooked within the slot, the improvement in the fastener comprising
   (a) a pair of similar hook plates slidably interconnected in overlapping relation with opposite ends of the plates extending outwardly of the adjacent plate, said plates each having a hook portion in the extended portion of the plate and along a common edge and laterally aligned strap slots laterally spaced from the hook portion, each of said plates having a stop means extending laterally of the plane of the plate into overlying relationship with the adjacent end of an opposite plate to dispose the hook portions in a spaced aligned holding position, and
   (b) resilient means coupled to said plates and biasing the plates to dispose the hook portions in maximum longitudinally spaced relation corresponding to said holding position.

3. The structure of claim 2 having
   (a) pin and slot connections aligned with the hook portions and securing the plates together for limited expansion and retraction of the spacing of the hook portions, and
   (b) each of said plates having an offset wall portion centrally thereof and cooperatively defining a chamber, and
   (c) said resilient means being disposed within said chamber.

4. A fastener for hooked connection within a slot in a support member, comprising
   (a) a pair of hook plates interconnected in longitudinally overlapping relation for limited relative longitudinal movement in opposite directions, one opposite end of said plates having a hook extending longitudinally along one edge and a laterally spaced lip offset from the plane of the plate in the direction of the opposite plate, said plates having aligned strap slots intermediate the lateral width of the lips and defining a strap opening, and
   (b) resilient means biasing said plates in opposite outward directions to locate the hooks in maximum spaced relation.

5. A plate-like fastener for hooked connection along a major edge within a slot in a support member, comprising
   (a) a pair of identical plates of a generally rectangular configuration having opposite major side edges and opposite minor side edges, there being in each of said plates a notch in one minor edge defining a hook projecting along one major edge and a locating lip on the opposite major edge, said lip being laterally offset to define a locating shoulder aligned with the bottom edge of the notch, each of said plates having a strap slot extending parallel to the major edges between the locating shoulder and the opposite end,
   (b) means slidably interconnecting said plates with the hooks longitudinally aligned and oppositely disposed to extend in opposite directions with the lips projecting outwardly to align the locating shoulder with the adjacent minor edge of the opposite plate and with the strap slots aligned and partially offset longitudinally to define a strap receiving opening, said means permitting limited relative sliding movement of the plates, and
   (c) resilient means urging said plates in opposite directions on a line through the hook portions.

6. The fastener of claim 5 wherein
   (a) said plates have centrally located outwardly projecting depressions defining a chamber, and
   (b) said resilient means is disposed within said chamber.

7. A plate-like fastener for hooked connection along one major edge to a rectangular slot in a channel support member, comprising
   (a) a pair of identical plates of generally rectangular shape, each of said plates including a notch in one of the minor ends defining a hook to one side thereof and a locating lip to the opposite side, the major plate length including said hook substantially corresponding to the length of the channel slot, said lip being offset laterally to define a locating shoulder at the junction with the plate, each of said plates having a strap slot extending longitudinally of the plate and a parallel locating slot adjacent the hook and an attachment hole aligned with and longitudinally spaced from the locating slot, each of said plates having a central struck-out portion defining a recess, said plates being mounted in side by side relation with the hooks aligned and at opposite ends and with the central struck out portions aligned and defining a spring chamber, said locating slots being aligned with the holes of the opposite plate,
   (b) means journalled in said locating slots and secured in the aligned holes to provide for limited movement of the plates longitudinally of the locating slots, and
   (c) a coil spring disposed within the spring chamber and resiliently urging the plates in opposite directions to dispose the hooks outwardly into holding position, the force of said spring permitting manual collapsing of the plates to dispose the hooks inwardly into assembling position.

8. A fastener for releasably securing a strap to a channel support having a rectangular slot, comprising
   (a) a pair of identical plates of generally rectangular shape, each of said plates having a notch in one end defining a hook to one side thereof and a locating lip to the opposite side and having a notch in the opposite end aligned with the hook, the length of the plate including the hook and the aligned latter notch substantially corresponding to the length of the channel slot, said lip being offset to define a locating shoulder at the junction with the principal portion of the plate, each of said plates having a strap slot extending longitudinally of the plate generally in alignment with the lip and a locating slot generally in alignment with the hook and a rivet hole aligned with and spaced from the locating slot, each of said plates having a central struck-out portion defining a recess having generally flat end walls, said plates being assembled in side by side relation with the hooks longitudinally aligned and at opposite ends of the assembly and with the central struck out portions aligned and defining a spring chamber, said locating slots being aligned with the rivet holes of the opposite plate to provide for limited movement of the plates longitudinally of the locating slots, (b) rivets having a head larger than said locating slots and a stepped shank of a diameter corresponding to the slot adjacent the head and an outer portion generally corresponding to the rivet hole, the shank portion adjacent the head being of slightly greater length than the thickness of the plate, and (c) a coil spring disposed within the spring chamber and resiliently urging the plates in opposite directions to dispose the hooks outwardly of each other into holding position, the force of said spring permitting manual collapsing of the plates to dispose the hooks inwardly toward each other into anchor assembling position.

References Cited by the Examiner
UNITED STATES PATENTS

| | | | |
|---|---|---|---|
| 2,756,693 | 7/56 | Frost. | |
| 2,807,855 | 10/57 | Rodriquez | 24—265.2 |
| 2,877,529 | 3/59 | Elsner | 24—265 |
| 3,017,679 | 1/62 | Elsner | 24—201.4 |
| 3,030,686 | 4/62 | Burkhardt | 24—265.2 |
| 3,084,412 | 4/63 | Rodriquez | 24—265.2 |

DONLEY J. STOCKING, *Primary Examiner.*